(12) United States Patent
Imai et al.

(10) Patent No.: US 11,870,494 B2
(45) Date of Patent: Jan. 9, 2024

(54) DEVICE FOR COMMUNICATION, COMMUNICATION DEVICE, COMMUNICATION METHOD, DEVICE FOR CHARGING, AND COMPUTER READABLE STORAGE MEDIUM

(71) Applicant: SoftBank Corp., Tokyo (JP)

(72) Inventors: Hiromichi Imai, Tokyo (JP); Masaru Okada, Tokyo (JP)

(73) Assignee: SoftBank Corp., Tokyo (JP)

( * ) Notice: Subject to any disclaimer, the term of this patent is extended or adjusted under 35 U.S.C. 154(b) by 160 days.

(21) Appl. No.: 17/483,856

(22) Filed: Sep. 24, 2021

(65) Prior Publication Data

US 2022/0014268 A1 Jan. 13, 2022

Related U.S. Application Data

(63) Continuation of application No. PCT/JP2020/002936, filed on Jan. 28, 2020.

(30) Foreign Application Priority Data

Mar. 26, 2019 (JP) ................................ 2019-058084

(51) Int. Cl.
*H04B 10/116* (2013.01)
*H04B 10/40* (2013.01)
*H04B 10/50* (2013.01)

(52) U.S. Cl.
CPC ........... *H04B 10/116* (2013.01); *H04B 10/40* (2013.01); *H04B 10/502* (2013.01)

(58) Field of Classification Search
CPC ..... H04B 10/116; H04B 10/40; H04B 10/502
USPC .......................................................... 398/118
See application file for complete search history.

(56) References Cited

U.S. PATENT DOCUMENTS

| 6,347,001 | B1 | 2/2002 | Arnold |
| 10,348,404 | B1* | 7/2019 | Herman ............. H04B 10/0793 |
| 2009/0028573 | A1 | 1/2009 | Krill |
| 2013/0315604 | A1 | 11/2013 | Lopresti |
| 2014/0285141 | A1* | 9/2014 | Lee ..................... H02J 7/00034 320/108 |

(Continued)

FOREIGN PATENT DOCUMENTS

| JP | H02228139 A | 9/1990 |
| JP | H03152490 A | 6/1991 |

(Continued)

OTHER PUBLICATIONS

Office Action issued for counterpart Japanese Application No. 2019-058084, issued by the Japanese Patent Office dated Feb. 18, 2020 (drafted on Feb. 13, 2020).

(Continued)

*Primary Examiner* — Dalzid E Singh

(57) ABSTRACT

A device for communication including a gimbal and a communication unit being rotatably supported by the gimbal and having a communication port for optical wireless communication and an imaging unit for capturing an image in a direction in which the communication port executes optical wireless communication is provided. In addition, a communication device including the device for communication and (Continued)

a communication executing unit for executing optical wireless communication using the communication port is provided.

20 Claims, 10 Drawing Sheets

(56) References Cited

U.S. PATENT DOCUMENTS

| | | | | |
|---|---|---|---|---|
| 2016/0047890 | A1* | 2/2016 | Ryan | H04W 4/02 398/118 |
| 2017/0195512 | A1* | 7/2017 | Yamaguchi | G06V 40/10 |
| 2018/0257502 | A1* | 9/2018 | Park | H02J 50/10 |
| 2019/0018227 | A1 | 1/2019 | Maryfield | |
| 2019/0074899 | A1* | 3/2019 | Joseph | H04B 10/116 |
| 2019/0094889 | A1* | 3/2019 | Pohl | G05D 1/12 |
| 2019/0279475 | A1* | 9/2019 | Watt | G08B 5/36 |

FOREIGN PATENT DOCUMENTS

| | | |
|---|---|---|
| JP | 2007022382 A | 2/2007 |
| JP | 2016158079 A | 9/2016 |
| JP | 2017069803 A | 4/2017 |
| JP | 2019033626 A | 2/2019 |
| JP | 6821733 B2 | 1/2021 |
| KR | 20130125576 A | 11/2013 |

OTHER PUBLICATIONS

International Preliminary Report on Patentability for International Application No. PCT/JP2020/002936, issued by the International Bureau of WIPO dated Sep. 28, 2021.

Tomoyuki Miyamoto, "Safe optical wireless power supply system that releases equipment from wiring", Tokyo Institute of Technology, New Technology Presentation Meetings, Japan Science and Technology Agency, Oct. 17, 2017, pp. 1-24, [retrieved on Mar. 23, 2020], URL:https://shingi.jst.go.jp/var/rev0/0000/6536/2017_titech_8.pdf>.

Office Action issued for counterpart Japanese Application No. 2021-101460, issued by the Japanese Patent Office dated Sep. 7, 2021 (drafted on Sep. 3, 2021).

Office Action issued for counterpart United Kingdom Application 2115012.3, issued by the United Kingdom Intellectual Property Office dated Aug. 10, 2022.

Office Action issued for counterpart Korean Application 10-2021-7030172, issued by the Korean Intellectual Property Office dated Nov. 18, 2022.

* cited by examiner

DEVICE FOR COMMUNICATION, COMMUNICATION DEVICE, COMMUNICATION METHOD, DEVICE FOR CHARGING, AND COMPUTER READABLE STORAGE MEDIUM

The contents of the following Japanese and PCT applications are incorporated herein by reference:
NO. 2019-058084 filed in JP on Mar. 26, 2019, and
NO. PCT/JP2020/002936 filed in WO on Jan. 28, 2020.

BACKGROUND

1. Technical Field

The present invention relates to a device for communication, a communication device, a communication method, a device for charging, and a computer readable storage medium.

2. Related Art

Devices including drones and the like, which are remotely controlled by wireless signals from a controller, have been known (for example, refer to Patent Document 1).

PRIOR ART DOCUMENT

Patent Document

Patent Document 1: Japanese Patent Application Publication No. 2017-069803

It is desirable to provide a technique which allows for proper remote control of a device such as a drone regardless of radio wave environment.

DESCRIPTION OF EXEMPLARY EMBODIMENTS

Hereinafter, the present invention will be described through embodiments. However, the following embodiments do not limit the invention as claimed in the appended claims. Moreover, some combinations of features described in the embodiments may be unnecessary for a solution of the invention.

Figure 1:
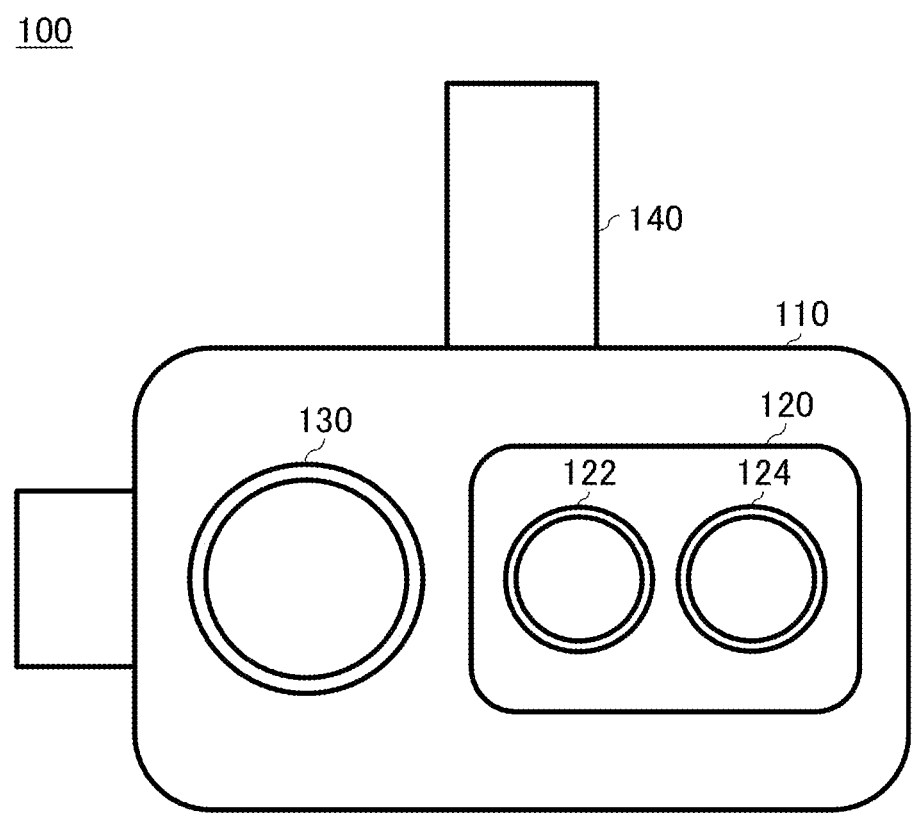
FIG. 1 schematically shows one example of a device 100 for communication.

FIG. 1 schematically shows one example of a device 100 for communication. The device 100 for communication includes a gimbal 140 and a communication unit 110 that is rotatably supported by the gimbal 140. The gimbal 140 works on one or more axes. The gimbal 140 is a 2-axis gimbal or a 3-axis gimbal, for example.

The communication unit 110 has a communication port 120 for optical wireless communication. The communication port 120 may include a light emitting port 122 and a light receiving port 124. The communication unit 110 may use any type of light for the optical wireless communication. For example, wavelengths of the light are in a range from infrared to visible light.

For example, when visible light is used, an LED (Light Emitting Diode) of various wavelengths can be obtained at a low cost. Therefore, a broadband can be easily achieved by superposition of multiple wavelengths, and a manufacturing cost of the device 100 for communication can be reduced. Alternatively, for example, when infrared rays are used, since the wavelength of infrared rays is longer than that of visible light, the infrared ways can reach a long distance with a small output. In addition, since the infrared rays are safe for eyes and invisible to the naked eye, communicating can be concealed.

The communication unit 110 includes an imaging unit 130. The imaging unit 130 captures an image in a direction in which the communication port 120 executes optical wireless communication. For example, the imaging unit 130 captures an image in a direction in which the light emitting port 122 emits light. A vector in the direction in which the communication port 120 executes the optical wireless communication and a vector in a main direction in which the imaging unit 130 captures an image may be the same. The main direction in which the imaging unit 130 captures an image is, for example, a direction along an optical axis of a lens included in the imaging unit 130.

Since optical wireless communication has high directivity, communication cannot be executed unless optical axes of communication ports included in communication objects are aligned. The device 100 for communication according to the present embodiment has a mechanism for automatically aligning an optical axis of the communication port 120 and an optical axis of a communication port 120 of a device 100 for communication included in a communication object.

Figure 2:
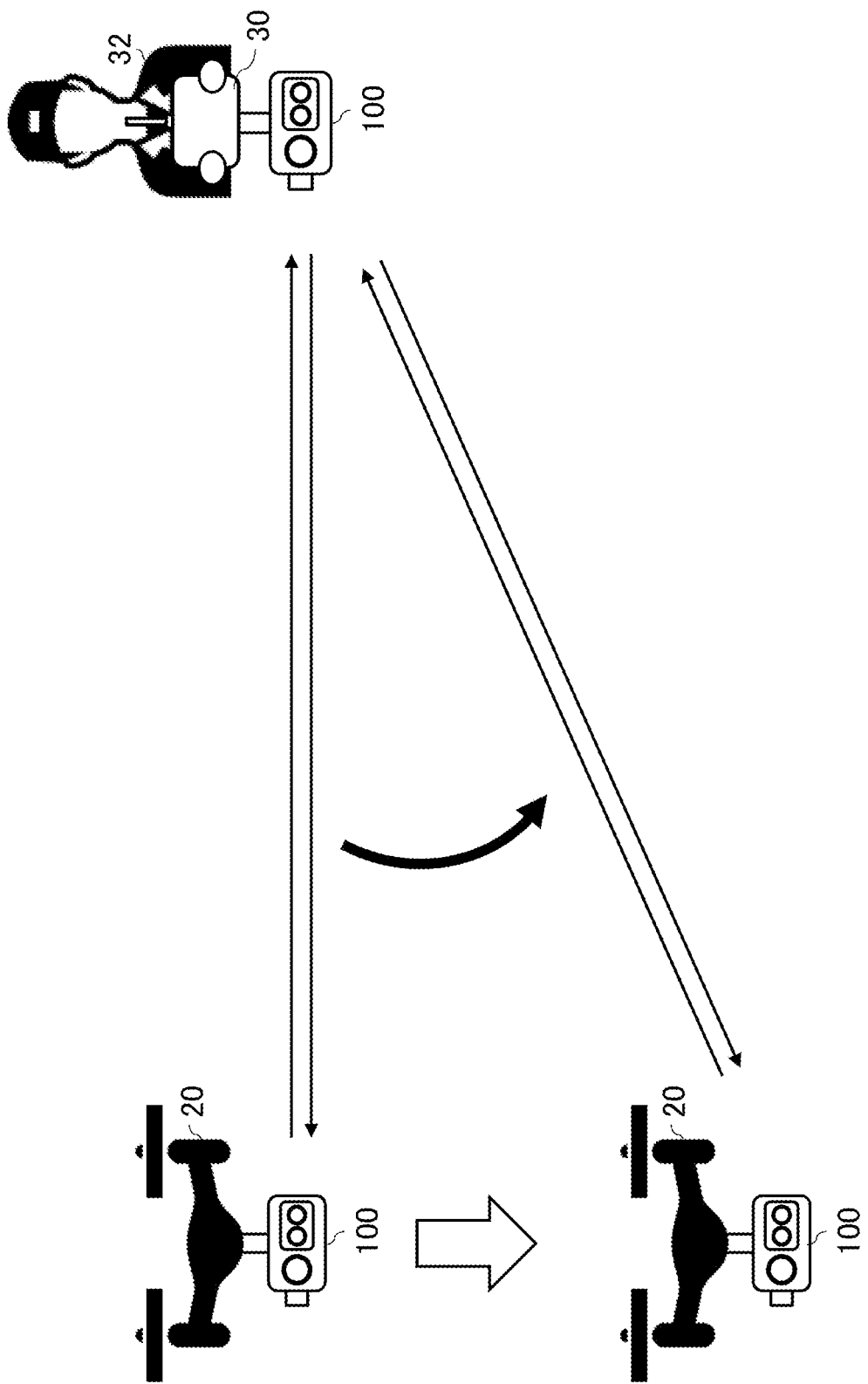
FIG. 2 schematically shows an example of use of the device 100 for communication.

FIG. 2 schematically shows an example of use of the device 100 for communication. The device 100 for communication is attached to each of an unmanned aircraft 20 such as a drone, and a controller 30 for controlling the unmanned aircraft 20, for example.

For example, each of the unmanned aircraft 20 and the controller 30 has an imaging unit 130 for capturing an image that is then analyzed to recognize each other, and a gimbal 140 for continuously adjusting an angle of a communication port 120 so as to track each other. When the unmanned aircraft 20 and the controller 30, each having the communication port 120, determine that optical axes of the communication ports 120 are aligned based on an image captured by the imaging unit 130, an optical wireless communication link is established.

For example, the optical wireless communication link is established before the unmanned aircraft 20 begins to fly. For example, while an operator 32 moves the controller 30 such that the device 100 for communication attached to the controller 30 and the device 100 for communication of the unmanned aircraft 20 placed at an arbitrary position face each other, the unmanned aircraft 20 and the controller 30 establish an optical wireless communication link in accordance with the flow described above. Alternatively, another person may cooperate with the operator 32 and hold the unmanned aircraft 20 so that the device 100 for communication of the unmanned aircraft 20 and the device 100 for communication of the controller 30 face each other, for example.

The optical wireless communication link may be established after the unmanned aircraft 20 begins to fly. For example, while the unmanned aircraft 20 is flying with a function of autonomous flight, and the operator 32 moves the controller 30 such that the device 100 for communication of the unmanned aircraft 20 and the device 100 for communication of the controller 30 face each other, the unmanned aircraft 20 and the controller 30 establish an optical wireless communication link in accordance with the flow described above.

After establishing the optical wireless communication link, the unmanned aircraft 20 and the controller 30, each having the imaging unit 130 for capturing an image, recognize the image and continue tracking each other by adjusting an angle of the communication port 120 with the gimbal 140, and thereby maintaining alignment of optical axes of the communication ports 120. In this manner, even when the unmanned aircraft 20 moves freely in three-dimensional space, the alignment of the optical axes of the communication ports 120 can be maintained, which allows the optical wireless communication to continue.

Although a technique of controlling the unmanned aircraft 20 by radio waves has been known, normal flight is hindered in the vicinity of a device that generates an interfering radio wave, or when a magnetic storm occurs, or in an environment in which radio waves cause multipath, such as in a ship or in a tunnel. Even under such an environment, it may be desirable to make the unmanned aircraft 20 possible to fly. According to the device 100 for communication of the present embodiment, the unmanned aircraft 20 can be controlled by the optical wireless communication without depending on the radio wave environment.

Therefore, for example, when guarding an important person, the guarding can be performed with the unmanned aircraft 20 to which the device 100 for communication is attached, while using a device that generates an interfering radio wave so as to prevent intrusion of an unmanned aircraft 20 of a third party. In addition, for example, even in a magnetic storm or in a multipath environment, the unmanned aircraft 20 can be safely flown.

Figure 3:
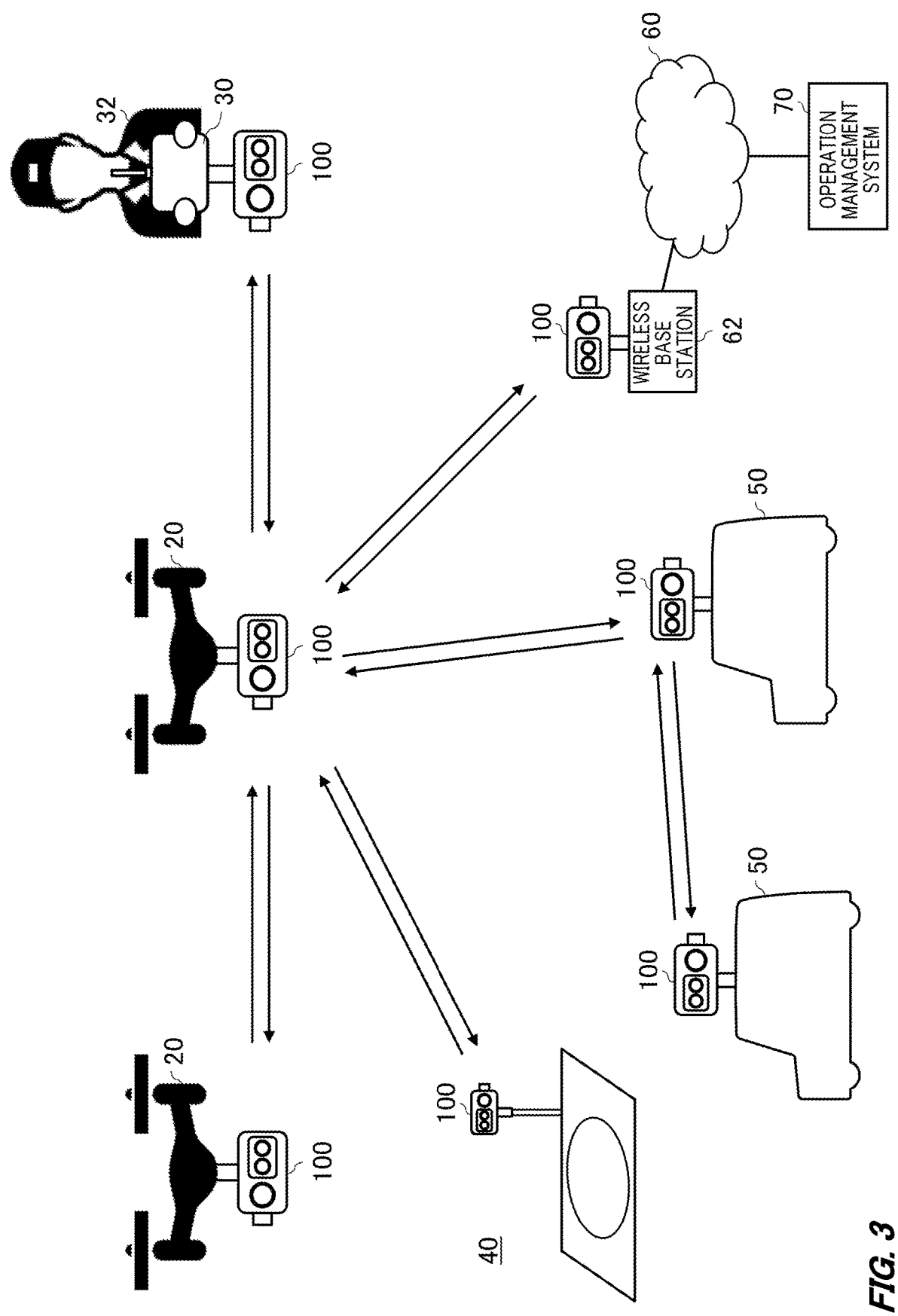
FIG. 3 schematically shows an example of use of the device 100 for communication.

FIG. 3 schematically shows an example of use of the device 100 for communication. The device 100 for communication may be attached to any object. FIG. 3 shows an example in which the device 100 for communication is attached to not only the unmanned aircraft 20 and the controller 30 but also each of a drone port 40, a vehicle 50, and a wireless base station 62.

The unmanned aircraft 20 to which the device 100 for communication is attached may execute optical wireless communication with another unmanned aircraft 20, the controller 30, the drone port 40, the vehicle 50, or the wireless base station 62, each of which is attached with the device 100 for communication. For example, the unmanned aircraft 20 may execute optical wireless communication with the wireless base station 62 in order to communicate with an operation management system 70 that is on a network 60 and manages the operation of the unmanned aircraft 20 via the wireless base station 62.

Further, for example, one vehicle 50 to which a device 100 for communication is attached may execute optical wireless communication with another vehicle 50 to which a device 100 for communication is attached. Furthermore, any other combination of objects, each being attached with a device 100 for communication, may execute optical wireless communication with each other.

Figure 4:
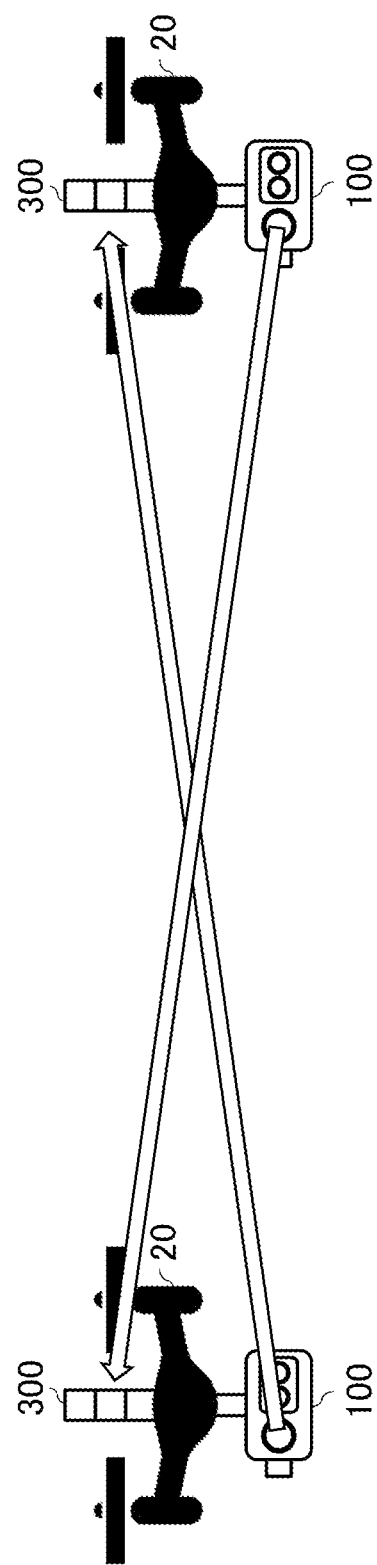
FIG. 4 schematically shows an example of use of the device 100 for communication.

FIG. 4 schematically shows one example of an unmanned aircraft 20 having a device 100 for communication and a light emitter 300. The light emitter 300 outputs light having a directivity lower than a directivity of light output from a light emitting port 122 of a communication port 120. The light output by the light emitter 300 may have a directivity lower than a directivity of the light output from the light emitting port 122 of the communication port 120, or may have no directivity.

The light emitter 300 may output visible light. The light emitter 300 may output colorless light, or may output colored light. The light emitter 300 may output light of a plurality of colors. Here, a case in which the light emitter 300 is an LED strobe light that outputs light of three colors will be described.

The unmanned aircraft 20 may transmit information to another unmanned aircraft 20 by controlling light emitted by the light emitter 300. A transmission of information by means of the light emission may be performed in any manner. For example, a flicker signal, in which light is emitted in different patterns in order to transmit information, is used. The unmanned aircraft 20 may obtain information from another unmanned aircraft 20, which is transmitted by controlling light emission of a light emitter 300, by capturing an image of the light emission of the light emitter 300 with an imaging unit 130 and analyzing the light emission.

For example, the unmanned aircraft 20 communicates by the light emitter 300 as a means for communication until establishing an optical wireless communication link with another unmanned aircraft 20. As a specific example, a first unmanned aircraft 20 and a second unmanned aircraft 20 transmit an authentication number by controlling light emission of a light emitter 300, and when authentication is determined to be approved, execute processing for establishing an optical wireless communication link.

The unmanned aircraft 20 may execute, after establishing an optical wireless communication link with another unmanned aircraft 20, communication by the light emitter 300 as a means for communication at a time of communication being disconnected or unstable for such a reason as misalignment between optical axes, too long distance, or the like. The unmanned aircraft 20 may communicate, after establishing an optical wireless communication link with another unmanned aircraft 20, information related to optical wireless communication by the light emitter 300. For example, the unmanned aircraft 20 transmits an error correction signal corresponding to the optical wireless communication by the light emitter 300. Communication by the light emitter 300 may be used in any application without being limited to the usage in the above examples.

Figure 5:
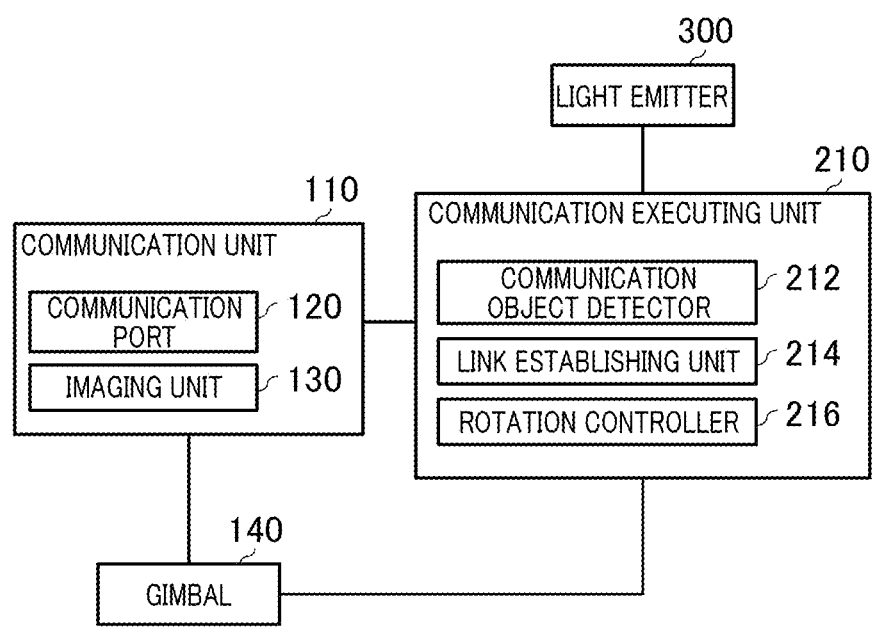
FIG. 5 schematically shows one example of a functional configuration of a communication device 200.

FIG. 5 schematically shows one example of a functional configuration of a communication device 200. The communication device 200 may be an unmanned aircraft 20, a controller 30, a drone port 40, a vehicle 50, a wireless base station 62, or the like. The communication device 200 may be a device installed in each of the unmanned aircraft 20, the controller 30, the drone port 40, the vehicle 50, or the wireless base station 62.

The communication device 200 includes a communication unit 110, a gimbal 140, a communication executing unit 210, and a light emitter 300. The communication executing unit 210 executes optical wireless communication using the communication unit 110. The communication executing unit 210 includes a communication object detector 212, a link establishing unit 214, and a rotation controller 216.

The communication object detector 212 detects a communication device 200 of a communication object based on an image captured by an imaging unit 130. For example, the communication object detector 212 detects, when light emission of a light emitter 300 of another communication device 200 captured by the imaging unit 130 satisfies a predetermined condition, the other communication device 200 as the communication device 200 of the communication object. For example, the predetermined condition is that light emission of the light emitter 300 of the other communication device 200 represents a preset authentication signal.

The link establishing unit 214 establishes an optical wireless communication link with the communication device 200 of the communication object. For example, when the link establishing unit 214 determines, based on an image captured by the imaging unit 130, that an optical axis of the communication unit 110 is aligned with an optical axis of the communication unit 110 of the communication device 200 of the communication object, then the link establishing unit 214 establishes an optical wireless communication link with the communication device 200 of the communication object.

The rotation controller 216 controls rotation of the communication unit 110 with the gimbal 140 based on an image captured by the imaging unit 130 in order to maintain the alignment of the optical axis of the communication unit 110 and the optical axis of the communication unit 110 of the communication device 200 of the communication object. The rotation controller 216 may cause the gimbal 140 to rotate the communication unit 110 in response to a change in relative positional relationship between the communication device 200 and the communication device 200 of the communication object.

The communication executing unit 210 transmits information by controlling light emission of the light emitter 300. The communication executing unit 210 transmits to the other communication device 200, for example, by controlling light emission of the light emitter 300, an authentication signal for performing authentication with the other communication device 200.

Also, the communication executing unit 210 transmits to the communication device 200 of the communication object, for example, by controlling the light emission of the light emitter 300, information related to optical wireless communication using the communication unit 110. The communication executing unit 210 transmits to the communication device 200 of the communication object, for example, by controlling the light emission of the light emitter 300, an error correction signal corresponding to the optical wireless communication using the communication unit 110.

The communication device 200 may not necessarily include all of the communication unit 110, the gimbal 140, the communication executing unit 210, and the light emitter 300. For example, the communication device 200 may not include the light emitter 300.

Further, for example, the communication device 200 may not include a communication port 120. In other words, the communication device 200 communicates by the imaging unit 130 and the light emitter 300 without having a function of executing optical wireless communication. In this case, the communication executing unit 210 performs a transmission of an authentication signal and a transmission of a data signal, or the like, by controlling light emission of the light emitter 300, for example. The communication executing unit 210 may be one example of an information transmitting unit. In addition, the communication executing unit 210 captures an image of the light emitter 300 included in the communication device 200 of the communication object by the imaging unit 130 so as to obtain from the communication device 200 of the communication object, an authentication signal, a data signal, or the like that are transmitted by controlling light emission of the light emitter 300. The communication executing unit 210 may be one example of an information obtaining unit.

Figure 6:
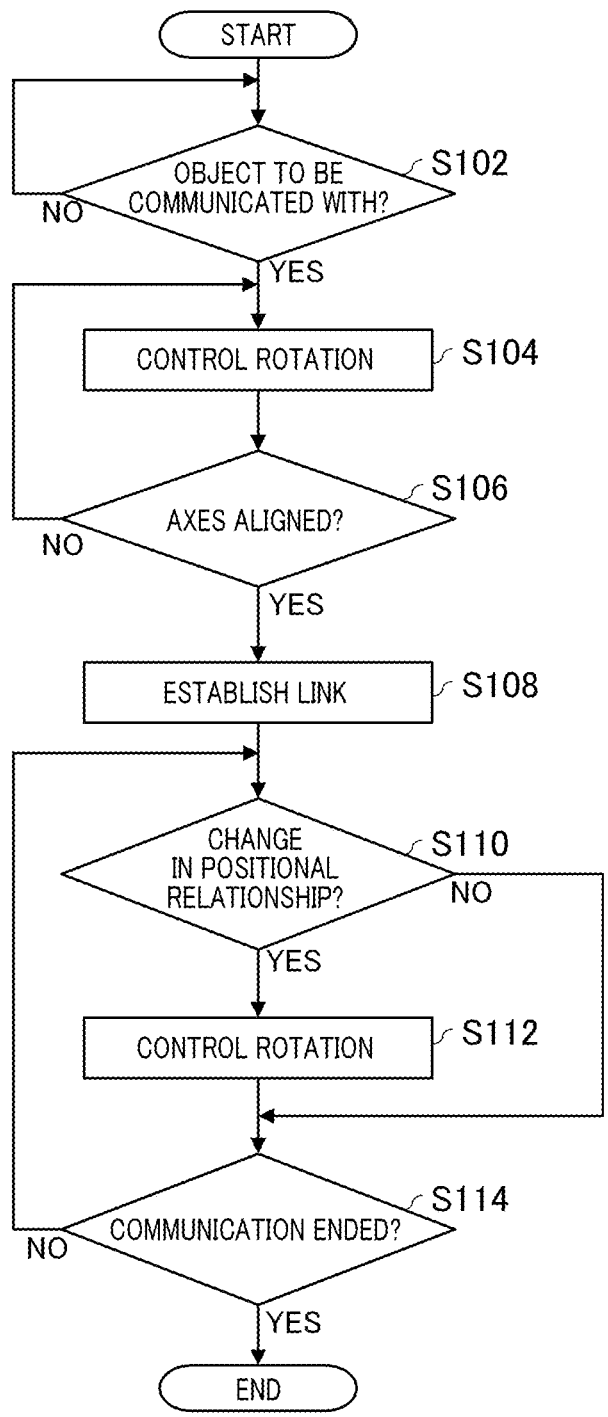
FIG. 6 schematically shows one example of a processing flow performed by the communication device 200.

FIG. 6 schematically shows one example of a processing flow performed by the communication device 200. Here, the communication executing unit 210 continuously analyzes an image captured by the imaging unit 130, and there is schematically shown a processing flow in which the communication device 200 and another communication device 200 establish an optical wireless communication link and communicate with each other via the optical wireless communication link, and then ends the communication.

In step S102, the communication executing unit 210 determines whether or not there is a communication device 200 of a communication object. The communication executing unit 210 determines, when a communication device 200 of the communication object is detected by the communication object detector 212, that there is the communication device 200 of the communication object.

In step S104, the rotation controller 216 controls the gimbal 140 to rotate the communication unit 110 based on an image captured by the imaging unit 130. In step S106, the link establishing unit 214 determines, based on an image captured by the imaging unit 130, whether or not an optical axis of the communication unit 110 is aligned with an optical axis of the communication unit 110 of the communication device 200 of the communication object. When it is determined that the optical axes are aligned, the processing proceeds to step S108, and when it is determined that the optical axes are not aligned, the processing returns to step S104.

In step S108, the link establishing unit 214 establishes an optical wireless communication link with the communication device 200 of the communication object. In step S110, the rotation controller 216 determines whether or not relative positional relationship between the communication device 200 and the communication device 200 of the communication object has changed. When it is determined that the relative positional relationship has changed, the processing proceeds to S112, and when it is determined that the relative positional relationship has not changed, the processing proceeds to step S114.

In step S112, the rotation controller 216 controls the gimbal 140 to rotate the communication unit 110 so as to maintain alignment of the optical axis of the communication unit 110 and the optical axis of the communication unit 110 of the communication device 200 of the communication object.

In step S114, it is determined whether or not communication between the communication device 200 and the communication device 200 of the communication object has ended. When it is determined that the communication has not ended, the processing returns to step S110, and when it is determined that the communication has ended, the processing ends.

Figure 7:
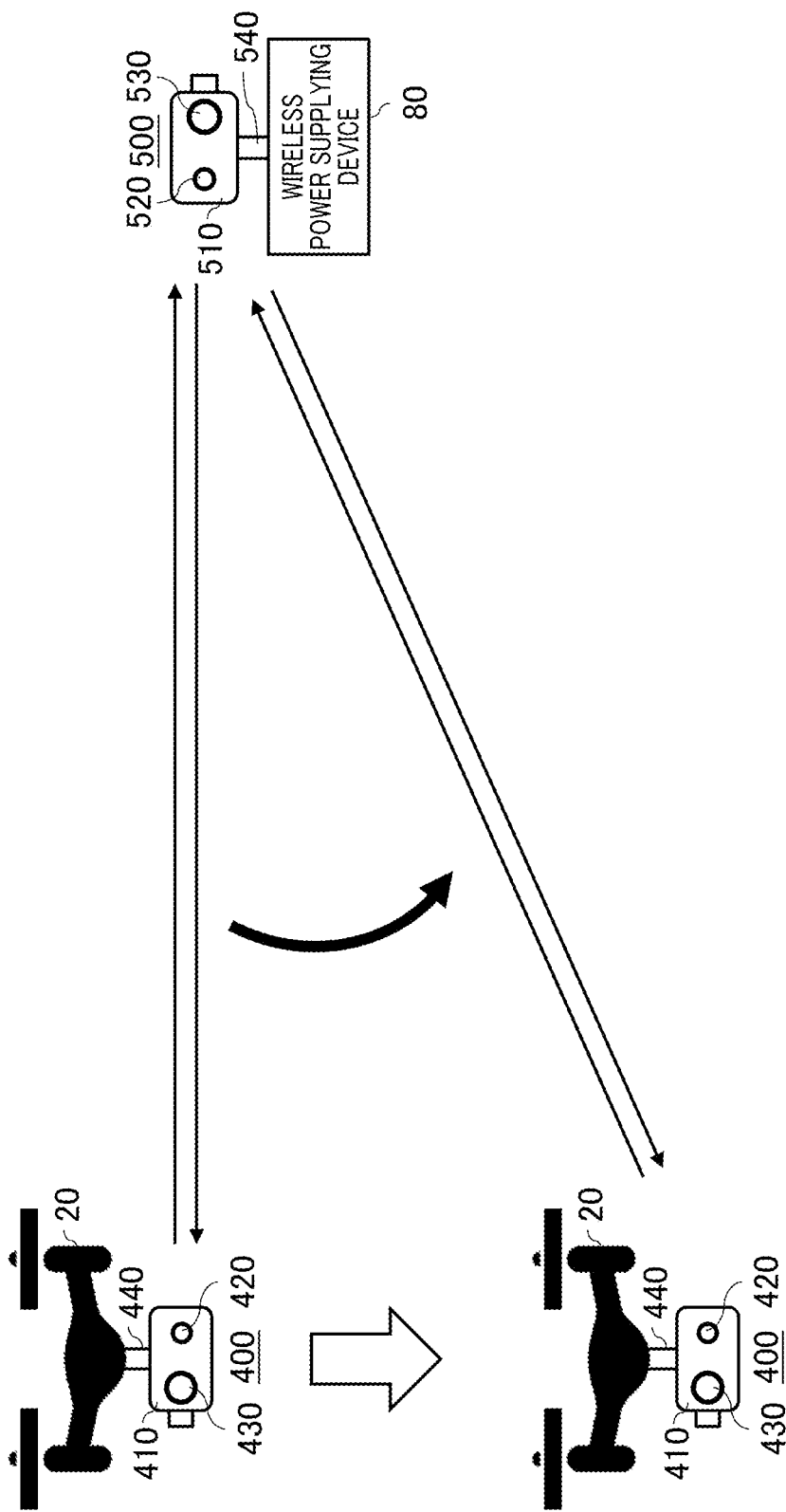
FIG. 7 schematically shows an example of use of a device 400 for charging and a power supplying device 500.

FIG. 7 schematically shows an example of use of a device 400 for charging and a power supplying device 500. The device 400 for charging adds a wireless charging function to a device to which the device 400 for charging is attached.

FIG. 7 shows an example in which the device 400 for charging is attached to an unmanned aircraft 20.

The device 400 for charging includes a gimbal 440 and a charging unit 410 rotatably supported by the gimbal 440. The gimbal 440 may be similar to the gimbal 140.

The charging unit 410 includes a wireless power receiving port 420 for wireless power reception and an imaging unit 430. For example, the imaging unit 430 captures an image in a direction opposite to a direction in which the wireless power receiving port 420 receives power. A vector in the direction opposite to the direction in which the wireless power receiving port 420 receives power and a vector in a main direction in which the imaging unit 430 captures an image may be the same.

A power supplying device 500 is attached to a wireless power supplying device 80, and has a function of supplying power to the device 400 for charging. The power supplying device 500 includes a gimbal 540 and a power supplying unit 510 rotatably supported by the gimbal 540. The gimbal 540 may be similar to the gimbal 140.

The power supplying unit 510 includes a wireless power supplying port 520 for wireless power supply and an imaging unit 530. For example, the imaging unit 530 captures an image in a direction in which the wireless power supplying port 520 wirelessly supplies power. A vector in the direction in which the wireless power supplying port 520 wirelessly supplies power and a vector in the main direction in which the imaging unit 430 captures an image may be the same.

For example, an unmanned aircraft 20 and the wireless power supplying device 80 analyze an image captured by the imaging unit 430 and the imaging unit 530, respectively, so as to recognize each other. The unmanned aircraft 20 continuously adjusts an angle of the charging unit 410 by means of the gimbal 440, and the wireless power supplying device 80 continuously adjusts an angle of the power supplying unit 510 by means of the gimbal 540 so that the unmanned aircraft 20 and the wireless power supplying device 80 track each other. When the unmanned aircraft 20 and the wireless power supplying device 80 determine that axes of the wireless power receiving port 420 and the wireless power supplying port 520 are aligned based on a captured image, then the unmanned aircraft 20 and the wireless power supplying device 80 establish a link for charging. Establishment of the link for charging may be performed in the same way as establishing the optical wireless communication link described in FIG. 2.

After establishing a charging link, the unmanned aircraft 20 and the wireless power supplying device 80 recognize each other by the captured image, and adjust the angles of the charging unit 410 and the power supplying unit 510, and thereby maintaining alignment of the axes of the wireless power receiving port 420 and the wireless power supplying port 520.

Figure 8:
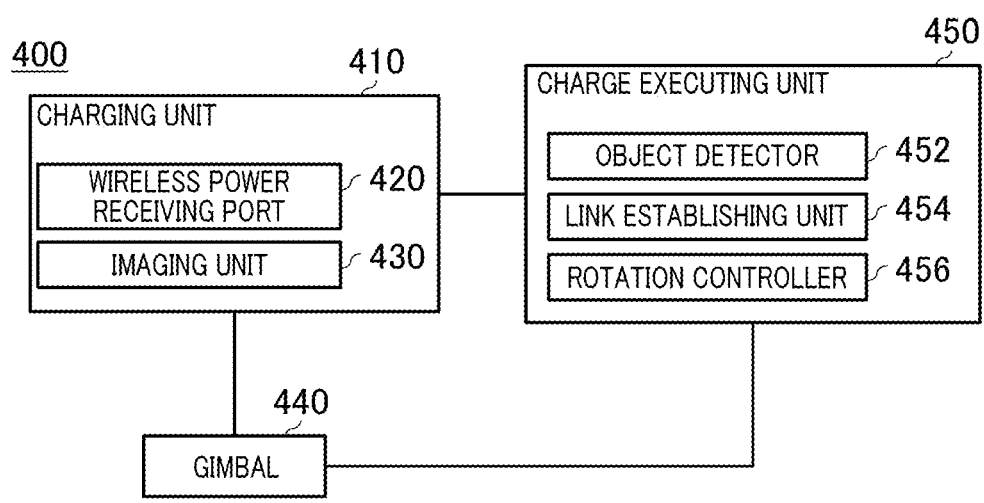
FIG. 8 schematically shows one example of a functional configuration of the device 400 for charging.

FIG. 8 schematically shows one example of a functional configuration of a charge executing unit 450 for charging by means of the device 400 for charging. The charge executing unit 450 is placed in a device to which the device 400 for charging is attached.

The charge executing unit 450 includes an object detector 452, a link establishing unit 454, and a rotation controller 456. The object detector 452 detects an object that executes wireless power supply. The object detector 452 detects a wireless power supplying device 80 being the object based on an image captured by an imaging unit 430. The object detector 452 may identify the wireless power supplying device 80 by analyzing the image captured by the imaging unit 430. Alternatively, for example, when a wireless power supplying device 80 has a light emitter similar to the light emitter 300, the wireless power supplying device 80 is detected as the object when light emission of the light emitter of the wireless power supplying device 80 captured by the imaging unit 430 satisfies a predetermined condition.

The link establishing unit 454 establishes a charging link with the wireless power supplying device 80 being the object. For example, when the link establishing unit 454 determines, based on an image captured by the imaging unit 430, that an axis of the wireless power receiving port 420 is aligned with an axis of the wireless power supplying port 520 of the power supplying device 500 attached to the wireless power supplying device 80, then the link establishing unit 454 establishes a charging link. The charge executing unit 450 may charge the device to which the device 400 for charging is attached with power received via the charging link established by the link establishing unit 454.

The rotation controller 456 controls, based on an image captured by the imaging unit 430, rotation of the charging unit 410 with the gimbal 440 in order to maintain the alignment of the axis of the wireless power receiving port 420 and the axis of the wireless power supplying port 520. The rotation controller 456 may cause the gimbal 440 to rotate the charging unit 410 in response to a change in relative positional relationship between the device to which the device 400 for charging is attached and the wireless power supplying device 80.

Figure 9:
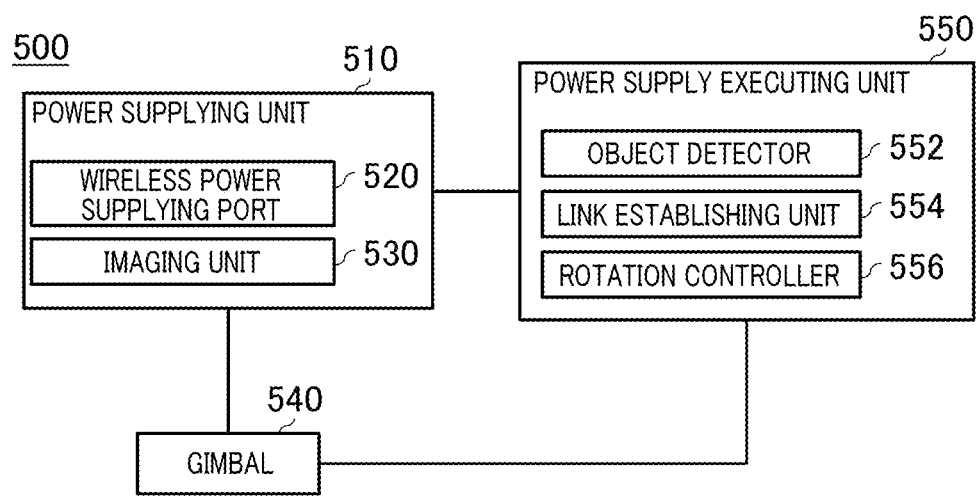
FIG. 9 schematically shows one example of a functional configuration of the power supplying device 500.

FIG. 9 schematically shows one example of a functional configuration of a power supply executing unit 550 for supplying power by means of the power supplying device 500. The power supply executing unit 550 is placed in a wireless power supplying device 80 to which the power supplying device 500 is attached.

The power supply executing unit 550 includes an object detector 552, a link establishing unit 554, and a rotation controller 556. The object detector 552 detects an object to which wireless power supply is executed. The object detector 552 detects an unmanned aircraft 20 having a device 400 for charging being the object, based on an image captured by an imaging unit 530. The object detector 552 may identify the unmanned aircraft 20 by analyzing the image captured by the imaging unit 530. Alternatively, for example, when an unmanned aircraft 20 has a light emitter 300, the unmanned aircraft 20 is detected as the object when light emission of the light emitter 300 of the unmanned aircraft 20 captured by the imaging unit 530 satisfies a predetermined condition.

The link establishing unit 554 establishes a charging link with the unmanned aircraft 20 being the object. For example, when the link establishing unit 554 determines, based on an image captured by the imaging unit 530, that an axis of the wireless power supplying port 520 is aligned with an axis of the wireless power receiving port 420 of the device 400 for charging attached to the unmanned aircraft 20, then the link establishing unit 554 establishes a charging link.

The rotation controller 556 controls, based on an image captured by the imaging unit 530, rotation of the power supplying unit 510 with the gimbal 540 in order to maintain the alignment the axis of the wireless power receiving port 420 and the axis of the wireless power supplying port 520. The rotation controller 556 may cause the gimbal 540 to rotate the power supplying unit 510 in response to a change in relative positional relationship between the unmanned aircraft 20 to which the device 400 for charging is attached and the wireless power supplying device 80.

Figure 10:
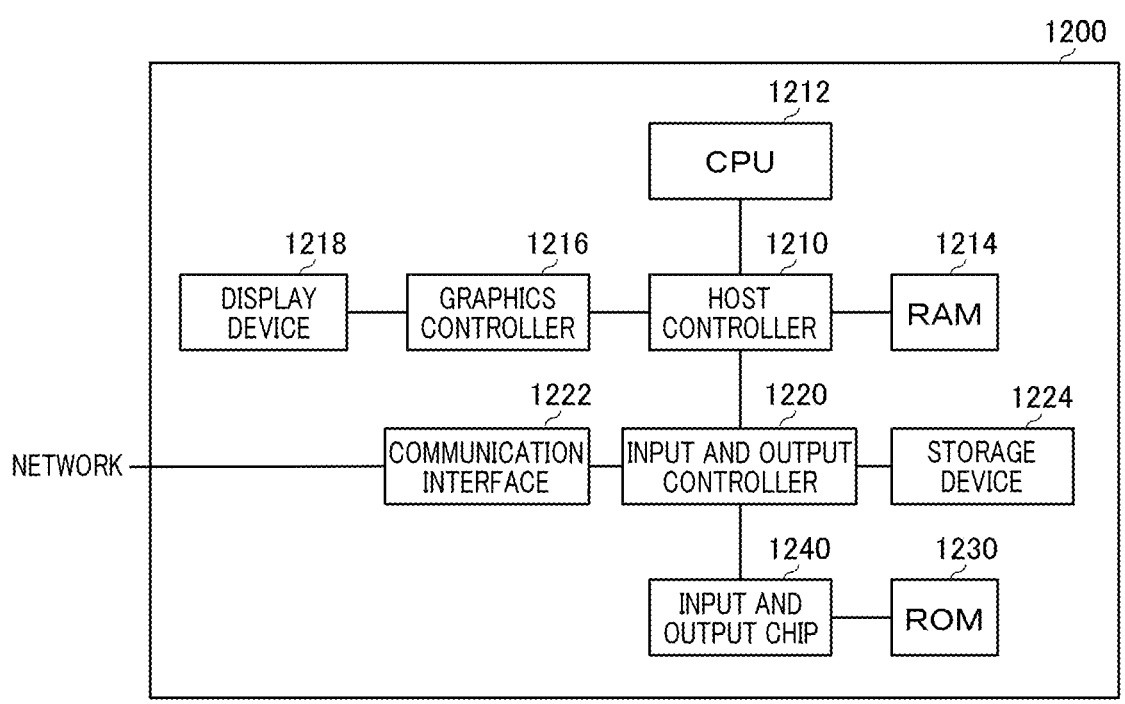
FIG. 10 schematically shows one example of a hardware configuration of a computer 1200 which functions as a communication executing unit 210, a charge executing unit 450, or a power supply executing unit 550.

FIG. 10 schematically shows one example of a hardware configuration of a computer 1200 which functions as the communication executing unit 210, the charge executing unit 450, or the power supply executing unit 550. Programs installed in the computer 1200 can cause the computer 1200 to function as one or more "parts" of the devices according to the present embodiments, or cause the computer 1200 to execute operations associated with the devices according to the present embodiments or the one or more "parts", and/or cause the computer 1200 to execute a process according to the present embodiments or steps of the process. Such a program may be executed by a CPU 1212 in order to cause the computer 1200 to execute certain operations associated with some or all of blocks of the flowcharts and the block diagrams described herein.

The computer 1200 according to the present embodiment includes the CPU 1212, a RAM 1214, and a graphics controller 1216, which are interconnected by a host controller 1210. The computer 1200 also includes a communication interface 1222, a storage device 1224, and an input and output unit such as an IC card drive, which are connected to the host controller 1210 via an input and output controller 1220. The storage device 1224 may be a hard disk drive, a solid-state drive, or the like. The computer 1200 also includes a ROM 1230 and a legacy input and output unit such as a keyboard, which are connected to the input and output controller 1220 via an input and output chip 1240.

The CPU 1212 operates according to the programs stored in the ROM 1230 and the RAM 1214, thereby controlling each unit. The graphics controller 1216 obtains image data which is generated, by the CPU 1212, in a frame buffer or the like provided in the RAM 1214 or in itself so as to cause the image data to be displayed on a display device 1218.

The communication interface 1222 communicates with other electronic devices via a network. The storage device 1224 stores programs and data used by the CPU 1212 in the computer 1200. The IC card drive reads the program and data from an IC card, and/or writes the program and data to the IC card.

The ROM 1230 stores, in itself, a boot program or the like that is executed by the computer 1200 during activation, and/or a program that depend on hardware of the computer 1200. The input and output chip 1240 may also connect various input and output units to the input and output controller 1220 via a USB port, a parallel port, a serial port, a keyboard port, a mouse port, or the like.

The program is provided by a computer readable storage medium such as an IC card. The program is read from the computer readable storage medium, installed in the storage device 1224, the RAM 1214, or the ROM 1230, which is also an example of the computer readable storage medium, and executed by the CPU 1212. Information processing written in these programs are read by the computer 1200, and provides a link between the program and various types of hardware resources described above. A device or a method may be configured by implementing the operation or process of the information according to the use of the computer 1200.

For example, when a communication is executed between the computer 1200 and an external device, the CPU 1212 may execute a communication program loaded in the RAM 1214, and instruct the communication interface 1222 to process the communication based on the process written in the communication program. Under the control of the CPU 1212, the communication interface 1222 reads transmission data stored in a transmission buffer region provided in a recording medium such as the RAM 1214, the storage device 1224, or the IC card, transmits the read transmission data to the network, or writes received data which is received from the network to a receiving buffer region or the like provided on the recording medium.

Further, the CPU 1212 may execute various types of processes on the data on the RAM 1214 such that the RAM 1214 reads all or necessary parts of a file or database stored in an external recording medium such as the storage device 1224 and the IC card. Then, the CPU 1212 may write back the processed data to the external recording medium.

Various types of information such as various types of programs, data, tables, and databases may be stored in recording media and subjected to the information processing. The CPU 1212 may execute various types of processes on the data read from the RAM 1214 to write back a result to the RAM 1214, the processes being described throughout the present disclosure, specified by an instruction sequence of the program, and including various types of operations, information processing, condition determinations, conditional branching, unconditional branching, information retrievals/replacements, or the like. Further, the CPU 1212 may search for information in the file, the database, or the like in the recording medium. For example, when a plurality of entries each having an attribute value of a first attribute associated with an attribute value of a second attribute are stored in the recording medium, the CPU 1212 may search, from the plurality of entries, for an entry that matches a condition in which the attribute value of the first attribute is specified, and read the attribute value of the second attribute stored in the entry, thereby obtaining the attribute value of the second attribute associated with the first attribute that satisfies a predetermined condition.

The programs or software module described above may be stored on the computer 1200 or in a computer readable storage medium near the computer 1200. Further, a recording medium such a hard disk or a RAM provided in a server system connected to a dedicated communication network or the Internet can be used as a computer readable storage medium, thereby providing the program to the computer 1200 via the network.

The flowchart and the blocks in the block diagrams according to the present embodiment may represent a step of a process in which an operation is executed or a "part" of a device which has a role of executing an operation. A specific step and "part" may be implemented by a dedicated circuit, a programmable circuit supplied along with a computer readable instruction stored on a computer readable storage medium, and/or a processor supplied along with the computer readable instruction stored on the computer readable storage medium. The dedicated circuit may include a digital and/or analog hardware circuit, or may include an integrated circuit (IC) and/or a discrete circuit. The programmable circuit may include, for example, a reconfigurable hardware circuit including logical AND, logical OR, logical XOR, logical NAND, logical NOR, and other logical operations, and a flip-flop, a register, and a memory element, such as a field programmable gate array (FPGA) and a programmable logic array (PLA).

The computer readable storage medium may include any tangible device capable of storing an instruction executed by an appropriate device, so that the computer readable storage medium having the instruction stored thereon constitutes a product including an instruction that may be executed in order to provide means to execute an operation specified by a flowchart or a block diagram. Examples of the computer readable storage medium may include an electronic storage medium, a magnetic storage medium, an optical storage medium, an electromagnetic storage medium, a semiconductor storage medium, or the like. More specific examples of computer readable storage medium may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, etc.

The computer readable instruction may include either of source code or object code written in any combination of one or more programming languages including: an assembler instruction, an instruction-set-architecture (ISA) instruction, a machine instruction, a machine dependent instruction, a microcode, a firmware instruction, state-setting data; or an object oriented programming language such as Smalltalk (registered trademark), JAVA (registered trademark), C++, or the like; and a conventional procedural programming language such as a "C" programming language or a similar programming language.

The computer readable instruction may be provided to a general purpose computer, a special purpose computer, or a processor or a programmable circuit of another programmable data processing apparatus locally or via a local area network (LAN), a wide area network (WAN) such as the Internet or the like in order that the general purpose computer, the special purpose computer, or the processor or the programmable circuit of another programmable data processing apparatus is to execute the computer readable instruction to provide means to execute operations specified by the flowchart or the block diagram. Examples of processors include computer processors, processing units, microprocessors, digital signal processors, controllers, microcontrollers, and the like.

While the embodiments of the present invention have been described, the technical scope of the present invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the present invention.

The operations, procedures, steps, and stages of each process performed by an device, system, program, and method shown in the claims, specification, or diagrams can be performed in any order as long as the order is not indicated by "prior to," "before," or the like and as long as the output from a previous process is not used in a later process. Even if the process flow is described using phrases such as "first" or "next" in the claims, specification, or diagrams, it does not necessarily mean that the process must be performed in this order.

EXPLANATION OF REFERENCES

20: unmanned aircraft; 30: controller; 32: operator; 40: drone port; 50: vehicle; 60: network; 62: wireless base station; 70: operation management system; 80: wireless power supplying device; 100: device for communication; 110: communication unit; 120: communication port; 122: light emitting port; 124: light receiving port; 130: imaging unit; 140: gimbal; 200: communication device; 210: communication executing unit; 212: communication object detector; 214: link establishing unit; 216: rotation controller; 300: light emitter; 400: device for charging; 410: charging unit; 420: wireless power receiving port; 430: imaging unit; 440: gimbal; 450: charge executing unit; 452: object detector; 454: link establishing unit; 456: rotation controller; 500: power supplying device; 510: power supplying unit; 520: wireless power supplying port; 530: imaging unit; 540: gimbal; 550: power supply executing unit; 552: object detector; 554: link establishing unit; 556: rotation controller; 1200: computer; 1210: host controller; 1212: CPU; 1214: RAM; 1216: graphics controller; 1218: display device; 1220: input and output controller; 1222: communication interface; 1224: storage device; 1230: ROM; 1240: input and output chip

What is claimed is:

1. A communication device, comprising:
   a communication port for directional wireless communication;
   a light emitter for outputting light having a directivity lower than a directivity of the communication port;
   an imaging unit for obtaining an image; and
   a gimbal for supporting the communication port and the imaging unit, wherein
      the communication device determines, based on the image, whether or not the communication port and a communication port included in a communication object are communicable with each other, and when determined to be communicable, controls so as to start wireless communication with the communication object, and
      the communication device controls so as to transmit information to another communication device by controlling light emission of the light emitter.

2. The communication device according to claim 1, wherein a vector in a direction in which the communication port executes wireless communication and a vector in a main direction in which the imaging unit captures an image is the same.

3. The communication device according to claim 1, wherein the communication device determines, based on the image, whether or not a direction of the communication port is aligned with a direction of a communication port included in a communication device of a communication object, and if being aligned, controls so as to start establishing a wireless communication link with the communication object.

4. The communication device according to claim 1, wherein the communication device controls, based on the image, rotation of the gimbal such that a direction of the communication port is aligned with a direction of a communication port of a communication object.

5. The communication device according to claim 1, wherein the communication device detects, based on the image, a communication device of a communication object, and controls so as to start the wireless communication with the communication device of the detected communication object.

6. The communication device according to claim 5, wherein
   the imaging unit captures an image of light emission of a light emitter included in the another communication device, and
   the communication device controls so as to detect, when the light emission of the light emitter satisfies a predetermined condition, the another communication device as the communication device of the communication object.

7. The communication device according to claim 6, wherein the light emitter included in the another communication device emits visible light.

8. The communication device according to claim 1, wherein the communication device controls, when optical wireless communication with the communication object becomes disconnected or unstable, light emission of the light emitter.

9. The communication device according to claim 1, wherein the communication device controls, by controlling light emission of the light emitter, so as to transmit an authentication signal for performing authentication with the another communication device.

10. The communication device according to claim 1, wherein the communication device controls, by controlling light emission of the light emitter, so as to transmit information related to wireless communication using the communication port to the another communication device.

11. The communication device according to claim 10, wherein the communication device controls, by controlling light emission of the light emitter, so as to transmit an error correction signal corresponding to wireless communication using the communication port to the another communication device.

12. The communication device according to claim 1, wherein
the communication port is for optical wireless communication, and
the communication device determines, based on the image, whether or not the communication port and a communication port included in a communication object are communicable with each other, and when determined to be communicable, controls so as to start optical wireless communication with the communication object.

13. A non-transitory computer readable storage medium stored therein a program for causing a computer to function as a communication device
wherein the communication device
includes a communication port for directional wireless communication, a light emitter for outputting light having a directivity lower than a directivity of the communication port, an imaging unit for obtaining an image, and a gimbal for supporting the communication port and the imaging unit,
determines, based on the image, whether or not the communication port and a communication port included in a communication object are communicable with each other, and when determined to be communicable, controls so as to start optical wireless communication with the communication object, and
controls so as to transmit information to another communication device by controlling light emission of the light emitter.

14. A communication method of a communication device having a communication port for directional wireless communication, a light emitter for outputting light having a directivity different from a directivity of the communication port, an imaging unit capable of obtaining an image, and a gimbal for supporting the communication port and the imaging unit, comprising:
obtaining the image;
determining, based on the image, whether or not the communication port and a communication port of a communication object are communicable with each other;
communicating in which, when determined to be communicable, wireless communication with the communication object starts; and
transmitting, by controlling light emission of the light emitter, information to another communication device.

15. The communication method according to claim 14, further comprising:
controlling, based on the image, rotation of the gimbal such that a direction of the communication port is aligned with a direction of a communication port of a communication object.

16. The communication method according to claim 14, further comprising:
obtaining, based on light emission of a light emitter included in the another communication device captured by the imaging unit, information transmitted by the another communication device.

17. The communication method according to claim 14, wherein
the communication port is for optical wireless communication, and
the communicating starts, when determined to be communicable, optical wireless communication with the communication object.

18. A device for charging, comprising:
a wireless power receiving port for wireless charging;
an imaging unit for obtaining an image; and
a gimbal for supporting the wireless power receiving port and the imaging unit, wherein the device for charging determines, based on the image, whether or not a wireless power transmission can be performed between the wireless power receiving port and a targeted wireless power supplying port, and controls, when determined that the wireless power transmission can be performed, so as to start charging.

19. A non-transitory computer readable storage medium stored therein a program for causing a computer to function as a device for charging, wherein the device for charging
includes a wireless power receiving port for wireless charging, an imaging unit for obtaining an image, and a gimbal for supporting the wireless power receiving port and the imaging unit, and
determines, based on the image, whether or not a wireless power transmission can be performed between the wireless power receiving port and a targeted wireless power supplying port, and controls, when determined that the wireless power transmission can be performed, so as to start charging.

20. A controlling method of a device for charging having a wireless power receiving port for wireless charging, an imaging unit capable of obtaining an image, and a gimbal for supporting the wireless power receiving port and the imaging unit, comprising:
obtaining the image;
determining, based on the image, whether or not a wireless power transmission can be performed between the wireless power receiving port and a targeted power supplying port; and
charging in which, when determined that the wireless power transmission can be performed, wireless charging of the device starts.

* * * * *